US012645522B2

(12) United States Patent
Chacko et al.

(10) Patent No.: US 12,645,522 B2
(45) Date of Patent: Jun. 2, 2026

(54) METHOD AND SYSTEM FOR DIAGNOSING A MALFUNCTIONING OR MISUSED DEVICE

(71) Applicant: MOTOROLA SOLUTIONS, INC., Chicago, IL (US)

(72) Inventors: Rexy Prakash Chacko, Gelugor (MY); Murali Kuyimbil, Penang (MY); Aina Aziz, Parit Buntar (MY); Hong Wei Lim, Air Itam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 35 days.

(21) Appl. No.: 18/314,952

(22) Filed: May 10, 2023

(65) Prior Publication Data

US 2024/0378104 A1 Nov. 14, 2024

(51) Int. Cl.
*G06F 11/00* (2006.01)
*G06F 11/07* (2006.01)
*G06F 11/30* (2006.01)
*G06F 11/32* (2006.01)
*G06V 20/40* (2022.01)
*G06V 20/52* (2022.01)

(52) U.S. Cl.
CPC ...... *G06F 11/0781* (2013.01); *G06F 11/0778* (2013.01); *G06F 11/3058* (2013.01); *G06F 11/32* (2013.01); *G06V 20/44* (2022.01); *G06V 20/52* (2022.01)

(58) Field of Classification Search
CPC ............ G06F 11/0781; G06F 11/3058; G06F 11/0778; G06F 11/32
See application file for complete search history.

(56) References Cited

U.S. PATENT DOCUMENTS

2021/0158936 A1* 5/2021 Rao ........................ G16H 40/67

FOREIGN PATENT DOCUMENTS

| AU | 2019206069 B2 | 12/2020 |
|---|---|---|
| CN | 107959847 B | 12/2019 |
| DE | 102017001305 B4 | 4/2018 |
| JP | H11249925 A1 | 9/1999 |
| JP | 6088679 B1 | 3/2017 |
| KR | 0179252 B1 | 4/1999 |

OTHER PUBLICATIONS

LG, LG Manual, Mar. 23, 2022, https://images.thdstatic.com/, 15 pages (Year: 2022).*
LG, LG Customer Care Portfolio, Apr. 17, 2021, https://web.archive.org/, 4 pages (Year: 2021).*

* cited by examiner

*Primary Examiner* — Katherine Lin

(57) ABSTRACT

A method, system and computer program product for diagnosing a malfunctioning or misused electronic device is disclosed. The method includes performing analytics on at least one of video and audio to automatically detect at least one anomaly exhibited by the electronic device or exhibited in relation to user interaction with the electronic device, the at least one anomaly being distinguishable from other non-present anomalies detectable by a computer system that carries out the performing of the analytics.

18 Claims, 3 Drawing Sheets

<u>200</u>

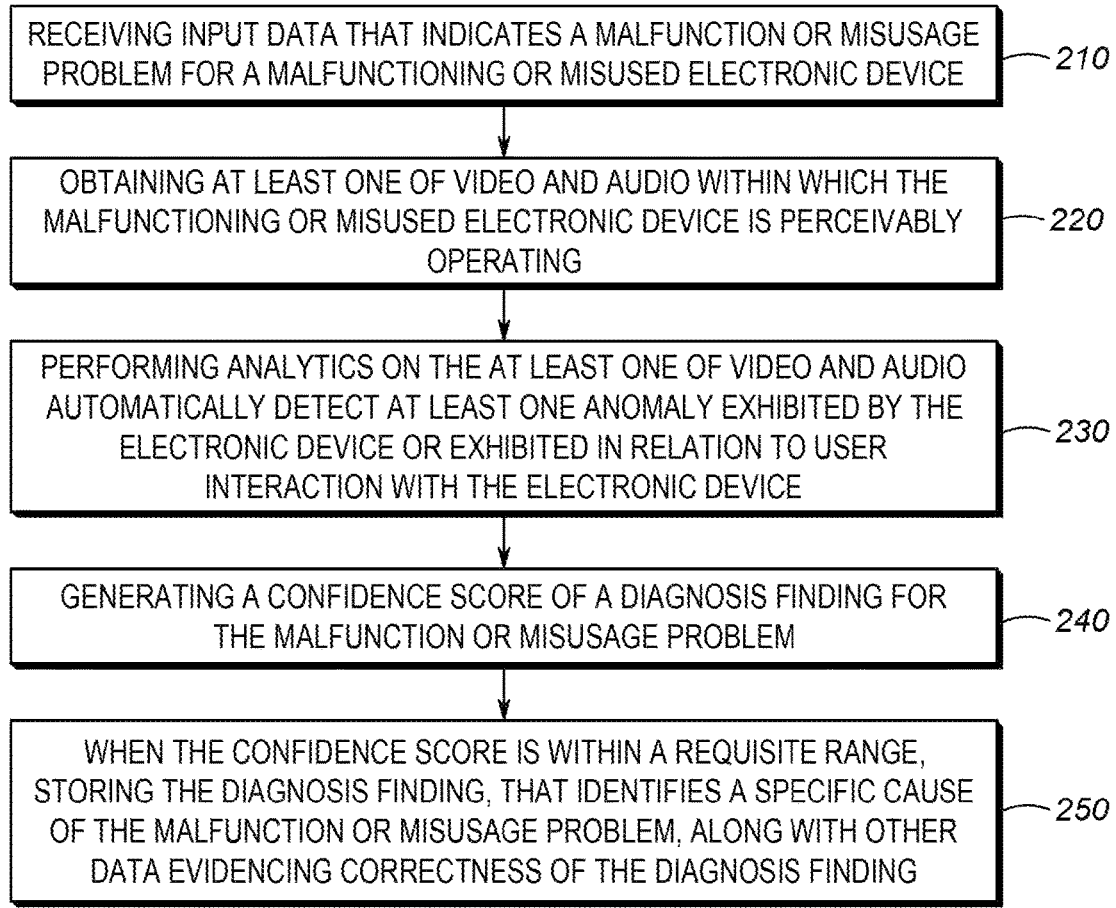

_200_

RECEIVING INPUT DATA THAT INDICATES A MALFUNCTION OR MISUSAGE PROBLEM FOR A MALFUNCTIONING OR MISUSED ELECTRONIC DEVICE ~210

OBTAINING AT LEAST ONE OF VIDEO AND AUDIO WITHIN WHICH THE MALFUNCTIONING OR MISUSED ELECTRONIC DEVICE IS PERCEIVABLY OPERATING ~220

PERFORMING ANALYTICS ON THE AT LEAST ONE OF VIDEO AND AUDIO AUTOMATICALLY DETECT AT LEAST ONE ANOMALY EXHIBITED BY THE ELECTRONIC DEVICE OR EXHIBITED IN RELATION TO USER INTERACTION WITH THE ELECTRONIC DEVICE ~230

GENERATING A CONFIDENCE SCORE OF A DIAGNOSIS FINDING FOR THE MALFUNCTION OR MISUSAGE PROBLEM ~240

WHEN THE CONFIDENCE SCORE IS WITHIN A REQUISITE RANGE, STORING THE DIAGNOSIS FINDING, THAT IDENTIFIES A SPECIFIC CAUSE OF THE MALFUNCTION OR MISUSAGE PROBLEM, ALONG WITH OTHER DATA EVIDENCING CORRECTNESS OF THE DIAGNOSIS FINDING ~250

*FIG. 2*

METHOD AND SYSTEM FOR DIAGNOSING A MALFUNCTIONING OR MISUSED DEVICE

BACKGROUND

When an electronic device is broken or not working properly, an accurate report describing the device issue(s) is important. In particular, it is important to help: i) facilitate a correct diagnosis; and ii) facilitate a higher likelihood of a quick response time for an eventual device repair, both of which will hopefully in turn reduce the chances of an unsavory user experience, and lower potentially higher costs associated with resolving the device issue(s). However, when a user faces a device breakage or malfunction, it may be hard to narrate the issue in standard terminology (i.e. either vocally or by writing). Consequently, the result may be that incorrect terminology is used in the reporting process (for example, reporting that "the device is switched off" instead of reporting that "the device is in an idle state"). This problem with incorrect terminology can certainly hinder accurate issue diagnosis. There may also be narratable details, which may be pivotal to diagnosis of an issue, that the user of the device fails to notice (or otherwise omits) while narrating the problem.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 2 is a flow chart illustrating a computer-implemented method in accordance with an example embodiment.

Figure 1:
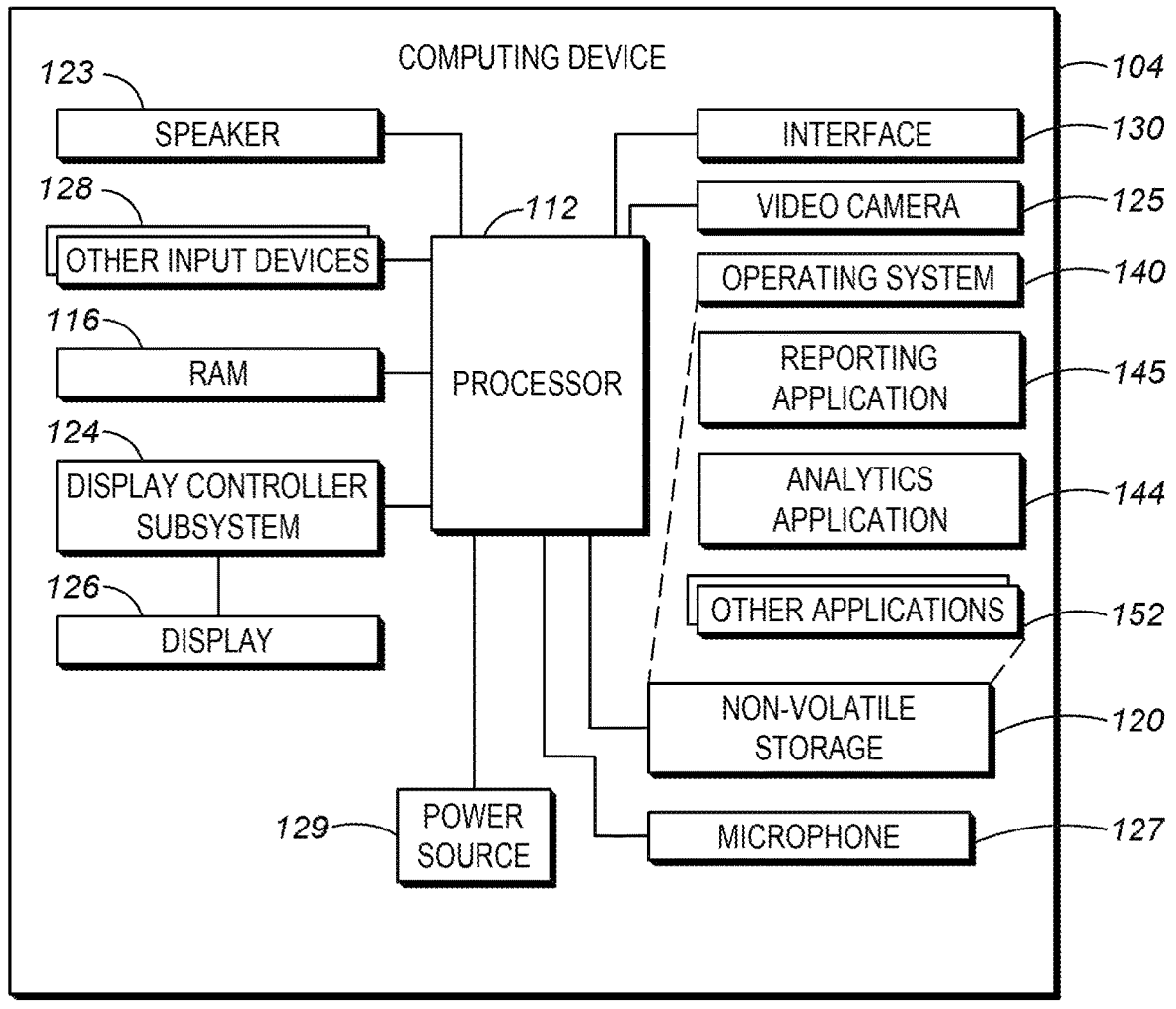
FIG. 1 is a block diagram of a computing device in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method that includes receiving input data that indicates a malfunction or misusage problem for a malfunctioning or misused electronic device. The computer-implemented method also includes obtaining, after the receiving of the input data, at least one of video and audio within which the malfunctioning or misused electronic device is perceivably operating. The computer-implemented method also includes performing analytics on the at least one of video and audio to automatically detect at least one anomaly exhibited by the electronic device or exhibited in relation to user interaction with the electronic device. The at least one anomaly is distinguishable from other non-present anomalies detectable by a computer system that carries out the performing of the analytics. The computer-implemented method also includes generating a confidence score of a diagnosis finding for the malfunction or misusage problem. When the confidence score is within a requisite range, the diagnosis finding, that identifies a specific cause of the malfunction or misusage problem, is stored along with other data evidencing correctness of the diagnosis finding.

According to another example embodiment, there is provided a system that includes at least one processor. The system also includes at least one of a video camera and a microphone that facilitates, during one or more time periods of operation of the system, capture of at least one of video and audio within which a malfunctioning or misused electronic device is perceivably operating. The system also includes at least one electronic storage medium storing program instructions that when executed by the at least one processor cause the at least one processor to perform: i) generating a user interface configured to receive input data that indicates a malfunction or misusage problem for the malfunctioning or misused electronic device; ii) performing analytics on the at least one of video and audio to automatically detect at least one anomaly exhibited by the electronic device or exhibited in relation to user interaction with the electronic device (the at least one anomaly being distinguishable from other non-present anomalies detectable by the system); iii) generating a confidence score of a diagnosis finding for the malfunction or misusage problem; and iii) when the confidence score is within a requisite range, storing the diagnosis finding, that identifies a specific cause of the malfunction or misusage problem, along with other data evidencing correctness of the diagnosis finding.

Each of the above-mentioned embodiments will be discussed in more detail below, starting with example system and device architectures of the system in which the embodiments may be practiced, followed by an illustration of processing blocks for achieving an improved technical method, system and computer program product for diagnosing a malfunctioning or misused device. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of a computing device 104 within which methods in accordance with example embodiments can be carried out. In some example embodiments, the computing device 104 is a computer system formed of a plurality of separately housed parts communicatively connected to each other; however in other example embodiments the computing device 104 is a computer system that is not necessarily physically implemented in such a manner, and may be a selected one or more of the following: a body worn camera device; a handheld device such as, for example, a tablet, a phablet, a smart phone or a personal digital assistant (PDA); a laptop computer; a smart television; and other suitable devices.

The illustrated computing device 104 includes at least one processor 112 that controls the overall operation of the computing device. The processor 112 interacts with various subsystems such as, for example, random access memory (RAM) 116, non-volatile storage 120, speaker 123, display controller subsystem 124, video camera 125, microphone 127 and other input devices 128 (such as a selected one or more of a keyboard, mouse, touch pad and roller ball, for example). The display controller subsystem 124 interacts with display 126 and it renders graphics and/or text upon the display 126. In some examples, the display 126 may be optionally integrated into a housing of the computing device 104 (any suitable device components like, for instance, the microphone 127, may be optionally integrated into the housing of the computing device 104).

The illustrated computing device 104 also includes a power source 129 which provides operating power within the computing device 104. In some examples, the power source 129 includes one or more batteries, a power supply with one or more transformers, etc.

The illustrated computing device 104 also includes interface 130. The interface 130 may include hardware, software, or both providing one or more interfaces for communication (such as, for example, packet-based communication) among the computing device 104, other computing devices similar to the computing device 104, any suitable networks, any suitable network devices, and/or any other suitable computer systems. As an example and not by way of limitation, the interface 130 may include a Network Interface Controller (NIC) or network adapter for communicating with an Ethernet or other wire-based network and/or a Wireless NIC (WNIC) or wireless adapter for communicating with a wireless network. In at least one example consistent with the example embodiment of FIG. 1, the interface 130 may include a USB port to support USB-complaint communications.

In some examples, the interface 130 comprises one or more radios coupled to one or more physical antenna ports. Depending on the example implementation, the interface 130 may be any type of interface suitable for any type of suitable network with which the computing device 104 is used. As an example and not by way of limitation, the computing device 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the computing device 104 may be capable of communicating with a Wireless PAN (WPAN) (such as, for example, a BLUETOOTH WPAN), a WI-FI™ network, a WI-MAX™ network, a Long-Term Evolution (LTE) network, an LTE-A network, a cellular telephone network (such as, for example, a Global System for Mobile Communications (GSM) network), or any other suitable wireless network or a combination of two or more of these. The computing device 104 may include any suitable interface 130 for any one or more of these networks, where appropriate.

In some examples, the interface 130 may include one or more interfaces for one or more external I/O devices. One or more of these external I/O devices may enable communication functionality between a person and the computing device 104 similar and/or complementary to communication functionality provided by, for instance, some examples of the input devices 128 previously described. As an example and not by way of limitation, an external I/O device may be any suitable input or output device, including alternatives more external in nature than other input devices (or output devices) herein mentioned (also, some combination of two or more of these is also contemplated). An external I/O device may include one or more sensors. Particular examples may include any suitable type and/or number of I/O devices and any suitable type and/or number of interfaces 130 for them. Where appropriate, the interface 130 may include one or more drivers enabling the processor 112 to drive one or more of these external I/O devices. The interface 130 may include one or more interfaces 130, where appropriate.

Still with reference to the computing device 104, operating system 140 and various software applications used by the processor 112 are stored in the non-volatile storage 120. The non-volatile storage 120 is, for example, one or more hard disks, solid state drives, or some other suitable form of computer readable medium that retains recorded information after the computing device 104 is turned off. Regarding the operating system 140, this includes software that manages computer hardware and software resources of the computing device 104 and provides common services for computer programs. Also, those skilled in the art will appreciate that the operating system 140, analytics application 144, and other applications 152, or parts thereof, may be temporarily loaded into a volatile store such as the RAM 116. The processor 112, in addition to its operating system functions, can enable execution of the various software applications on the computing device 104.

Regarding the analytics application 144, this carries out video and/or audio analytics. In some examples, the analytics application 144 may include one or more suitable learning machines to facilitate the video and/or audio analytics.

Figure 3:
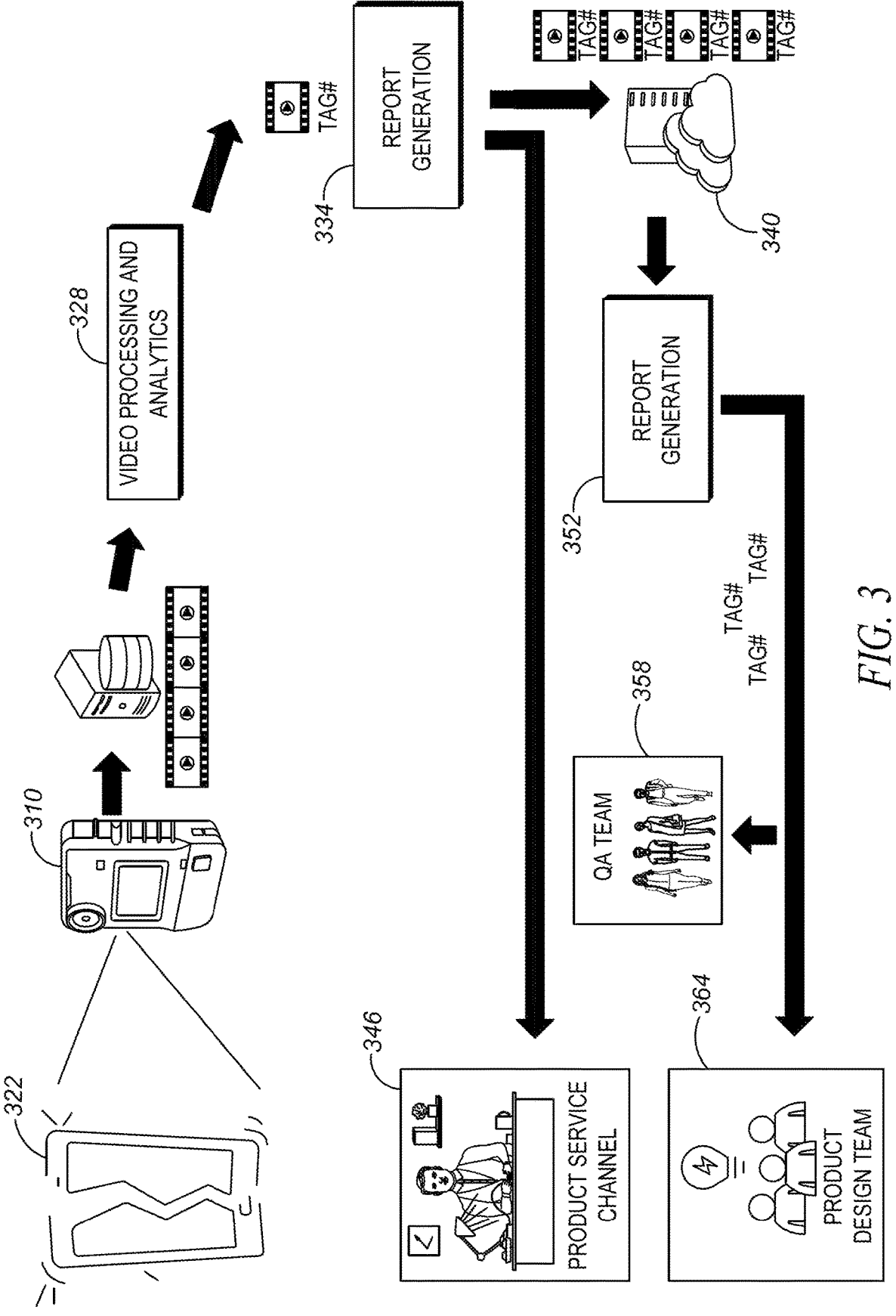
FIG. 3 is a block diagram of video capture, storage and processing in accordance with an example embodiment.

Reference is now made to FIGS. 2 and 3. FIG. 2 is a flow chart illustrating a method 200 in accordance with an example embodiment. FIG. 3 is a block diagram of video capture, storage and processing in accordance with an example embodiment. At least some of the drawing elements shown in FIG. 3 are plainly relatable to an understanding and elaboration upon the drawing elements shown in FIG. 3.

In FIG. 2, the illustrated method 200 includes receiving (210) input data that indicates a malfunction or misusage problem for a malfunctioning or misused electronic device. For instance, in FIG. 3 user input (or other input) may be provided to a body worn camera 310 to specify a malfunction or misusage problem in order to actuate a collections process as explained in further detail below.

Next, after the action 210, at least one of video and audio is obtained (220). Furthermore, within this at least one of video and audio the malfunctioning or misused electronic device is perceivably operating. For instance, in FIG. 3 the body worn camera 310 (a type of mobile camera) communicates captured video and audio, evidencing a malfunction or misusage problem for a malfunctioning or misused electronic device 322. It will also be noted that in FIG. 3 the body worn camera 310 is pointed at the electronic device 322 (that is turned on and operating), and video and audio, within which the electronic device 322 is shown and audible, is captured.

Also, it will be understood that other types of cameras besides the illustrated body worn camera 310 are contemplated. For example, the capturing of video consistent with example embodiments may be carried out by a fixed-location security camera, or any other suitable type of camera.

The electronic device 322 shown in FIG. 3 may be a malfunctioning electronic device in need of some potential repair. Alternatively, the electronic device 322 may be a misused electronic device unable to perform a device function due to incorrect (and user-attributable) device usage. In some examples, the electronic device 322 is communicatively coupled to the body worn camera 310 over a secure local area wireless network so as to facilitate extraction of further data relevant to the malfunction or misusage problem from the electronic device 322.

Next, the method 200 of FIG. 2 includes performing (230) analytics on the at least one of video and audio to automatically detect at least one anomaly exhibited by the electronic device or exhibited in relation to user interaction with the electronic device. The at least one anomaly is distinguishable from other non-present anomalies detectable by a computer system that carries out the performing of the analytics. In some examples, the at least one anomaly may be physical damage to the electronic device 322 or an environmental condition present in an operation area of the electronic device 322, and in such examples the physical damage or the environmental condition is perceivable within at least some of captured video and/or audio.

For instance, in FIG. 3 block 328 is diagrammatically representing video processing and analytics carried out on the video and audio within which the electronic device 322 is shown and is audible. In some examples, this video processing and analytics is carried out by the analytics application 144 (FIG. 1). In the case where applicable video has been captured, the action 230 may include performing video analytics on that video. In the case where applicable audio has been captured, the action 230 may include performing audio analytics on that audio. In at least one example, both video and audio analytics may be performed by the analytics application 144; however, it is also contemplated that each of the video analytics and the audio analytics may be performed by separate applications or modules.

Continuing on, the method 200 includes generating (240) a confidence score of a diagnosis finding for the malfunction or misusage problem. In some examples, the action 240 is carried out by the analytics application 144 (FIG. 1).

Next, when the generated confidence score is within a requisite range, the diagnosis finding (along with other data evidencing the correctness of the diagnosis finding) is stored (250). In respect of the diagnosis finding, this identifies a specific cause of the malfunction or misusage problem. In respect of the other data evidencing the correctness of the diagnosis finding this may include, for example, a generated short report which describes the malfunction or misusage problem in standard terminology, a plurality of video clips corresponding to parts of the video determined to be more relevant to the malfunction or misusage problem than other parts of the video not included within the video clips, etcetera. Also, it will be noted that "TAG #" in FIG. 3 is short-hand labelling for "tag identifier". In some examples, tag identifiers are employed to facilitate identification of stored files. For instance, individual or compiled video clips extracted from captured video footage may tag identifiers appended to (or otherwise associated with) them.

In FIG. 3, block 334 is diagrammatically representing report generation associated with the action 250. The one or more generated reports may be stored in computing device 340 (which be, for example, a cloud computing resource, or some other suitable computing device configured to store device problem reports).

It will be noted that FIG. 3 also diagrammatically illustrates other example actions. For instance, in addition to the one or more generated reports being stored in computing device 340, block 346 is diagrammatically representing a product service channel entity 346, which is an entity that services malfunctioning electronic devices, and the product service channel entity 346 may receive, concurrently or non-concurrently relative to report storage in the computing device 340, the one or more generated reports. In some examples, this action may be carried out when the electronic device 322 is a malfunctioning electronic device, but not when the electronic device 322 is a misused electronic device (categorization of former versus latter may be based on the diagnosis finding). In the former case, the diagnosis finding and the other data evidencing the correctness of the diagnosis finding may made automatically available to the product service channel entity 346. Also, as will be explained in more detail subsequently, an organization that sells (or otherwise deals) with electronic devices may, in the context of addressing issues that arise with electronic devices, include a plurality of hierarchical levels within the organization, and the product service channel entity 346 may belong to the first hierarchical level within the organization.

Still with reference to FIG. 3, block 352 is diagrammatically representing generation, deriving and/or reproduction of one or more additional reports. In the illustrated example embodiment, the one or more additional reports includes information that the diagnosis finding is being repeatedly stored in connection with a plurality of detection instances. Blocks 358 and 364 are diagrammatically representing a quality assurance entity (for example, quality assurance team) and a product design entity (for example, product design team) respectively, which receive the one or more additional reports. In at least one example, the quality assurance entity 358 and the product design entity 364 belong to a second hierarchical level of the aforementioned plurality of hierarchical levels within the organization (the second hierarchical level being a higher hierarchical level than the first hierarchical level).

As mentioned above, the one or more additional reports being provided to the second hierarchical level include information that the diagnosis finding is being repeatedly stored in connection with a plurality of detection instances. In at least one example, one or more learning machines forming a part of the reporting application 145 (FIG. 1) generates a confidence score to facilitate identification that a same or similar diagnosis finding is being repeatedly stored. If the confidence score (i.e. confidence score of the detection instances being matched in respect of the diagnosis finding) falls within a certain range, then the one or more additional reports are generated based on the confidence score being within that particular range. Similarly if the confidence score falls outside of the actionable range, then it may be determined that there is no diagnosis finding match (i.e. no generation of the one or more additional reports).

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot perform machine learning-based analytics on video/audio to automatically detect anomalies, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
  receiving input data that indicates a malfunction or misusage problem for a malfunctioning or misused electronic device;
  obtaining, via electronic communication and after the receiving of the input data, at least one of video and audio within which the malfunctioning or misused electronic device is perceivably operating;
  performing analytics, on the at least one of video and audio and using at least one processor of a computer system, to automatically detect at least one anomaly exhibited by the electronic device or exhibited in relation to user interaction with the electronic device, the at least one anomaly being distinguishable from other non-present anomalies detectable by the computer system that carries out the performing of the analytics;
  generating, using the at least one processor, a confidence score of a diagnosis finding for the malfunction or misusage problem; and
  when the confidence score is within a requisite range, storing the diagnosis finding, that identifies a specific cause of the malfunction or misusage problem, along with other data evidencing correctness of the diagnosis finding,
  wherein:
  the obtaining of the at least one of the video and the audio includes capturing the video via a mobile camera,
  the mobile camera is a body worn camera,
  the body worn camera is communicatively coupled to the electronic device over a secure local area wireless network, and
  further data, extractable from the electronic device and relevant to the malfunction or misusage problem, is writable to storage of the body worn camera.

2. The computer-implemented method of claim 1 wherein the malfunctioning or misused electronic device is a malfunctioning electronic device in need of a potential repair.

3. The computer-implemented method of claim 2 wherein the diagnosis finding and the other data evidencing correctness of the diagnosis finding are made automatically available to a first hierarchical level within an organization that services the malfunctioning electronic device.

4. The computer-implemented method of claim 3 further comprising identifying that the diagnosis finding is being repeatedly stored in connection with a plurality of detection instances and, in response, providing information about the diagnosis finding and the respective detection instances corresponding to the diagnosis finding to a second hierarchical level within the organization, wherein the second hierarchical level is a higher hierarchical level than the first hierarchical level.

5. The computer-implemented method of claim 4 wherein the first hierarchical level and the second hierarchical level are a device repair channel, and at least one of a quality assurance team and a product design team respectively.

6. The computer-implemented method of claim 4 wherein the identifying that the diagnosis finding is being repeatedly stored is based at least in part on whether an additional confidence score of the detection instances being matching in respect of the diagnosis finding falls within an additional range.

7. The computer-implemented method of claim 1 wherein the malfunctioning or misused electronic device is a misused electronic device unable to perform a device function due to incorrect user device usage.

8. The computer-implemented method of claim 1 wherein the obtaining of the at least one of the video and the audio is obtaining both the video and the audio, and the performing the analytics on the at least one of the video and the audio includes both performing video analytics on the video and performing audio analytics on the audio.

9. The computer-implemented method of claim 1 wherein the obtaining of the at least one of the video and the audio includes capturing the video via a fixed-location security camera.

10. The computer-implemented method of claim 1 wherein the at least one anomaly includes physical damage to the electronic device or an environmental condition present in an operation area of the electronic device, and the physical damage or the environmental condition being perceivable within the at least one of video and audio.

11. The computer-implemented method of claim 1 wherein the other data includes a generated short report which describes the malfunction or misusage problem in standard terminology.

12. The computer-implemented method of claim 1 wherein the other data includes a plurality of video clips corresponding to parts of the video determined to be more relevant to the malfunction or misusage problem than other parts of the video not included within the video clips.

13. A system comprising:

at least one processor;

at least one of a video camera and a microphone that facilitates, during one or more time periods of operation of the system, capture of at least one of video and audio within which a malfunctioning or misused electronic device is perceivably operating; and at least one electronic storage medium storing program instructions that when executed by the at least one processor cause the at least one processor to perform:

generating a user interface configured to receive input data that indicates a malfunction or misusage problem for the malfunctioning or misused electronic device;

performing analytics on the at least one of video and audio to automatically detect at least one anomaly exhibited by the electronic device or exhibited in relation to user interaction with the electronic device, the at least one anomaly being distinguishable from other non-present anomalies detectable by the system;

generating a confidence score of a diagnosis finding for the malfunction or misusage problem; and when the confidence score is within a requisite range, storing the diagnosis finding, that identifies a specific cause of the malfunction or misusage problem, along with other data evidencing correctness of the diagnosis finding, wherein:

the at least one of the video camera and the microphone is both the video camera and the microphone, the video camera is a body worn camera, the body worn camera is configured to communicative with the electronic device over a secure local area wireless network, and further data, extractable from the electronic device and relevant to the malfunction or misusage problem, is writable to storage of the body worn camera.

14. The system of claim 13 wherein the at least one of the video camera and the microphone includes a fixed-location video camera.

15. The system of claim 13 wherein the other data includes a generated short report which describes the malfunction or misusage problem in standard terminology.

16. The system of claim 13 wherein the other data includes a plurality of video clips corresponding to parts of the video determined to be more relevant to the malfunction or misusage problem than other parts of the video not included within the video clips.

17. The computer-implemented method of claim 1 wherein the storage is non-volatile storage.

18. The system of claim 13 wherein the storage is non-volatile storage.

\* \* \* \* \*